United States Patent [19]
Yamada

[11] Patent Number: 5,324,369
[45] Date of Patent: Jun. 28, 1994

[54] SPIKE PIN AND SYSTEM FOR MOUNTING A SPIKE PIN

[75] Inventor: Hiroshi Yamada, Kanazawa, Japan

[73] Assignee: Ishikawa Giken Gomu Kabushiki Kaisya, Kanazawa, Japan

[21] Appl. No.: 891,729

[22] Filed: Jun. 1, 1992

[30] Foreign Application Priority Data

| Jun. 4, 1991 | [JP] | Japan | 3-160920 |
| Feb. 7, 1992 | [JP] | Japan | 4-085876 |
| Feb. 26, 1992 | [JP] | Japan | 4-076313 |
| Mar. 9, 1992 | [JP] | Japan | 4-086265 |

[51] Int. Cl.$^5$ .................................. B60C 11/16
[52] U.S. Cl. ...................... 152/211; 152/212; 36/59 A
[58] Field of Search ............ 152/169, 188, 196, 197, 152/209 B, 210, 211, 212; 36/59 A

[56] References Cited

U.S. PATENT DOCUMENTS

| 1,065,949 | 7/1913 | Lorme | 152/210 X |
| 2,301,569 | 11/1942 | Mücklich | 152/210 |
| 3,160,190 | 12/1964 | Jediny | 152/210 |
| 3,473,591 | 10/1969 | Bingham | 152/210 |
| 3,545,515 | 12/1970 | Gottauf | 152/210 |
| 3,578,053 | 5/1971 | Milliken | 152/210 |
| 3,667,528 | 6/1972 | Gottauf | 152/210 |
| 4,076,065 | 2/1978 | Somers | 152/210 |

FOREIGN PATENT DOCUMENTS

| 2640581 | 3/1978 | Fed. Rep. of Germany . |
| 2703194 | 3/1978 | Fed. Rep. of Germany . |
| 1171769 | 2/1993 | Fed. Rep. of Germany . |
| 2655559 | 2/1993 | Fed. Rep. of Germany . |
| 61-188206 | 8/1986 | Japan . |
| 1249003 | 10/1989 | Japan . |
| 2-84459 | 3/1990 | Japan . |
| 2-274240 | 10/1990 | Japan . |
| 8301601 | 5/1983 | Sweden . |

Primary Examiner—Michael W. Ball
Assistant Examiner—Francis J. Lorin
Attorney, Agent, or Firm—Zarley, McKee, Thomte, Voorhees & Sease

[57] ABSTRACT

Spike pins made of hard rubber which may be used on vehicle tires, shoe soles or the shoes of walking sticks or the like and a system for mounting such spike pins made of hard rubber in a mounting surface such as the tread surface of vehicle tires or shoe soles or the shoes of walking sticks or the like, characterized in that the tread surface is formed with recesses in which each of said spike pin is mounted with a GaP between the periphery of the spike pin and the peripheral wall of the associated recess.

11 Claims, 5 Drawing Sheets

SPIKE PIN AND SYSTEM FOR MOUNTING A SPIKE PIN

TECHNICAL FIELD

This invention relates generally to the configuration of spike pins made of rigid rubber which may be used on vehicle tires, shoe soles or the tip end of walking sticks or the like and to a system for mounting such spike pins made of rigid rubber in a mounting surface such as the tread surface of vehicle tires or shoe soles or the tip end of walking sticks or the like.

This invention also relates to spike pins made of a rigid rubber material having a property of either being permanently rigid or hardening at a low temperature.

BACKGROUND ART

Spike pins for use on vehicle tires, shoe soles or tip ends of walking sticks to provide non-skidding function on ice and snow-covered roads have heretofore been made of metal.

However, it has been found that metal spike pins, especially ones used on vehicle tires may shave the road surface when they are covered with no ice or snow and produce dusts, posing an environmental problem, so that the use of metal spike pins has come to be regulated. In view of this, researches have been extensively conducted in search for new materials to replace metal for making spike pins.

In this regard, improvements on so-called studless tires have been made to modify the properties of the rubber itself of which tires are formed such that the rubber may be maintained in a soft condition even at a low temperature and may have an enhanced adhesiveness of the rubber to the ice and snow.

On the other hand, an attempt has also been made to make spike pins of other materials than metal such as synthetic resin or hard rubber for example.

As new materials, spike pins made of hard rubber have been proposed; for example, rubber compounds having a property of being in a softened state at a normal temperature and hardening at a low temperature (as disclosed in Japanese Patent Application Sho 63-235771 assigned to the assignee hereof) and rubber compounds having an increased hardness (as disclosed in Japanese Patent Application Hei 2-274240 assigned to the assignee hereof) have been developed.

In addition, spike pins made of metal for use on vehicle tires, shoe soles, or shoes of walking sticks as non-slipping means against ice and snow-covered roads have conventionally been mounted in such a manner that the spike pins protrude from the tread surface comprising the spike-mounting surface.

SUMMARY OF THE INVENTION

An object of the invention is to provide a system for mounting a spike pin made of hard rubber in the tread of vehicle tires, shoe soles, shoes of walking sticks or the like in such a manner as to further promote the non-slipping effect.

The spike pin formed of rubber having a property of hardening at a low temperature will soften at a normal temperature and harden on an ice and snow surface (naturally at a low temperature) to perform the function as a spike pin. However, internal heat build-up within a rotating tire due to vibrations and friction of the tire with a road surface can affect the hardening of the spike pin.

With this in mind, another object of the invention is to provide to prevent the spike pin from being softened by such heat and enhance the function of the spike pin formed of rubber which will harden at a low temperature. When used on crutches, shoe soles, tires and the like which are subjected to a load to prevent slipping on an ice and snow covered road, spike pins (made of metal, plastics or the like) have heretofore been made as a rigid pointed thin member and so mounted as to protrude from the tread to provide the non-slipping effect by piercing into the ice and snow.

With this construction, however, crutches, shoe soles, tires and the like were not able to perform the non-slip function when ice and snow thawed to expose the road surface, although they were able to accomplish their intended function in the season when there are ice and snow.

More specifically, the conventional spike pins tend to slip on and damage a road surface as they present a small contact surface against the road surface because of their thin pointed shape. They have thus been quite inconvenient to use and not completely satisfactory in respect of safety because they fail to consistently perform their intended functions depending on the conditions of a road surface in that they are not capable of providing the non-slipping effect both when the road surface is covered with snow or frozen and when the road surface is exposed.

With the foregoing in mind, it is still another object of the invention to provide a system for mounting spike pins capable of performing the non-skidding function, regardless of the conditions of road surfaces, whether the road surface may be covered with ice and snow or exposed with ice and snow thawed out.

Briefly, the present invention provides a system for mounting a spike pin made of hard rubber in a mounting surface, characterized in that a tread surface comprising said mounting surface is formed with a recess in which said spike pin is mounted with a gap between the periphery of the spike pin and the peripheral wall of said recess.

Said gap may be provided around a portion of the periphery of said spike pin. Said spike pin may be formed of a hard rubber having a property of hardening at a low temperature.

Further, a protective layer may be applied to the peripheral side of the spike pin. Said protective layer may be made of either the same material as or a material softer than that of which said mounting surface is formed.

The system for mounting a spike pin may include a soft portion comprising a mounting section defining said mounting surface and a rigid portion comprising said spike pin made of hard rubber, wherein the surface area and volume of said rigid portion is smaller than those of said soft portion, and the height of the rigid portion being such that its top end defining a tread is flush with or recessed form the top surface of the soft portion.

The spike pin is not limited to a cylindrical shape, but may be in the form of a polygonal prism or a polygonal pyramid. Said recess may be provided in the tread surface.

The hard rubber-made spike pin provides frictional resistance by biting into a contact surface of ice and snow under a load when it is forced into contact with the ice and snow surface.

Consequently, even if the tread surface is deformed or collapsed under a load, the deformed or collapsed portion is accommodated in the gap between the periphery of the pin portion of the rubber-made spike pin and the peripheral wall of said recess to prevent the pin portion being affected, and the pin portion which is capable of withstanding the load is able to protrude from the tread surface and bite into the contact surface of ice and snow.

In addition, in the case of the spike pin having a property of hardening at a low temperature, when there is ice and snow on the road, the tire, for example and the spike pin brought into contact with the road surface are cooled and become rigid. Moreover, even if rotation of the tire causes an internal heat build-up within the tire, making it hot, the ice and snow on the road surface are cut into small pieces by the tire being compressed due to rotation, load and frictional resistance, which pieces of ice and snow are jammed into said cooling gaps to effect the cooling of the spike pins.

When there is no ice and snow on a road surface, the spike pins will not perform the non-slip function, as they are softened by a heat as sensed from a tire which has been made hot by internal heat build-up due to rotation as well as from the contact portions of the spike pin with the road surface.

Ice and snow pieces are also jammed into the aforesaid recess formed in the tread of the spike pin to provide cooling to thereby maintain the pin portion in a cold and rigid state.

Further, the pin portion being made in the form of a post has a sufficient length to enable a prolonged use as it is worn away.

The pin portion having a polygonal transverse cross-section presents an increased number of angular corners to provide a sharper piercing action. The strength of the pin portion when it is in the form of a pyramid is increased.

Further, the protective layer surrounding the peripheral side wall of the spike pin serves to prevent the degradation and fracture of or any damage to the spike pin. Ice and snow pieces are forced into the Gap to provide a cooling effect through the protective layer to thereby maintain the low temperature enough to keep the spike pin in its rigid state.

When the tread of the crutch, shoe sole or tire is subjected to a load, the soft portion of soft rubber or soft synthetic resin surrounding the rigid portion in the form of a spike pin is deformed under a pressure due to the load.

The rigid portion of hard rubber or rigid synthetic resin in the form of a spike pin is naturally lower in compressive deformability against the road surface than the soft portion. Because of the rigid portion in the form of spike pin having a lower compressible deformability than the soft portion, the rigid portion is capable of thrusting against the road surface with its sharp tip to provide braking resistance. To obtain such function, it is required that the surface area and volume of the rigid portion be smaller than those of the soft portion.

It is thus to be appreciated that owing to the compound construction comprising the rigid and soft portions, the sharp tip in the form of spike pin will pierce through a snow layer under a load when the road is covered with snow or ice, and that when there is no snow on the road, the rigid portion in the form of spike pin will not pierce into the road surface even under a load while only the soft portion will be deformed to provide braking resistance against the road surface.

BRIEF DESCRIPTION OF THE DRAWINGS

These and other more detailed and specific objects and features of the present invention will be more fully disclosed in the following specification with reference to the accompanying drawings, in which.

DETAILED DESCRIPTION OF THE PREFERRED EMBODIMENTS

Embodiments of the present invention will now be described with reference to the accompanying drawings.

Figure 1:
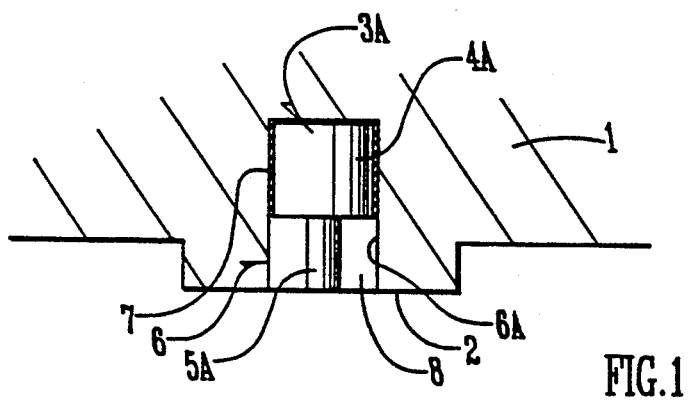
FIG. 1 is a front view, in a partly vertical cross-section, of a motor-car tire illustrating one embodiment of the present invention.

FIG. 1 is a vertical cross-sectional view of one embodiment of the present invention illustrating a motor-car tire 1 having a hard rubber-made spike pin 3A mounted in its tread surface 2.

The tread surface 2 is formed with a recess 6 in which a hard rubber-made spike pin 3A comprising a cylindrical base portion 4A and an elongated cylindrical pin portion 5A is mounted, with the cylindrical base portion 4A fitted in and secured to the bottom of the circular recess 6 by an adhesive 7, there being a gap 8 defined between the pin portion 5A and the peripheral wall 6A of the recess 6.

Figure 2:
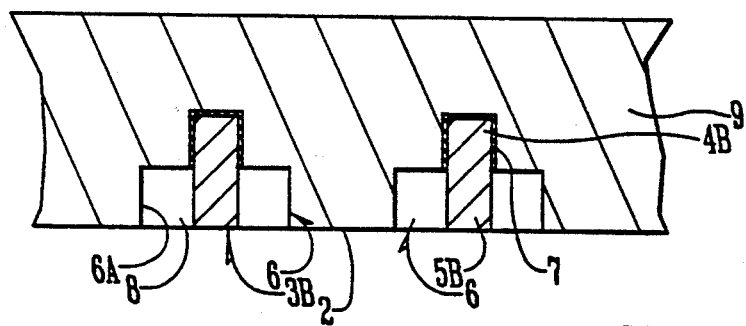
FIG. 2 is a front view, in a partly vertical cross-section, of a shoe sole illustrating another embodiment the present invention.

FIG. 2 is a vertical cross-sectional view of another embodiment of the present invention illustrating a shoe sole 9 having a hard rubber-made spike pin 3B mounted therein.

The spike pin 3B comprises a cylindrical body including a base portion 4B and a pin portion 5B having a uniform diameter and is mounted in a recess 6 formed in the sole 9 and having a bottom surface larger than the spike pin 3B, with the base portion 4B implanted deeper in the bottom surface and secured in place by an adhesive 7, there being a gap 8 defined between the pin portion 5B and the peripheral wall 6A of the recess 6.

Figure 3:
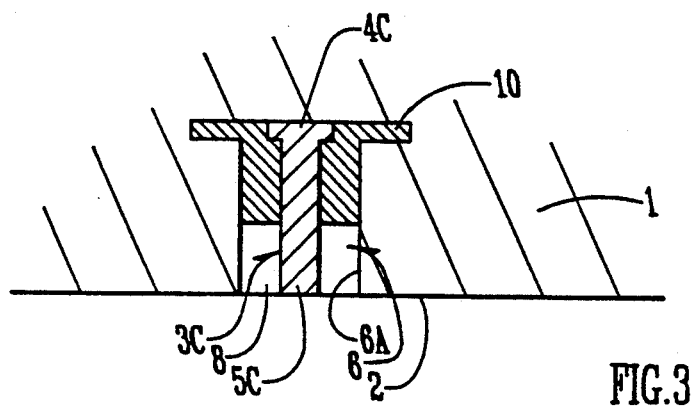
FIG. 3 is a front view, in a partly vertical cross-section, of a motor-car tire illustrating another embodiment of the present invention.

FIG. 3 is a vertical cross-sectional view of still another embodiment of the present invention illustrating a motor-car tire 1 having a hard rubber-made spike pin 3C mounted in its tread surface 2.

The spike pin 3C has a flange-like base portion 4C implanted in a fitting 10 so as to be prevented from being withdrawn therefrom. The spike pin 3C in unison with the fitting 10 is fitted and secured in a recess 6 formed in the tread surface 2, there being a gap 8 defined between the pin portion 5C and the peripheral wall 6A of the recess 6.

Figure 4:
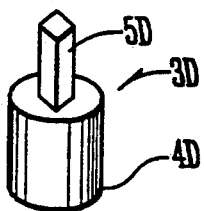
FIG. 4 is a perspective view illustrating one embodiment of rubber-made spike pin.

FIG. 4 is a perspective view illustrating one embodiment of rubber-made spike pin 3D comprising a cylindrical base portion 4D and a pin portion 5D in the form of quadrangular prism having a cross-sectional surface area contained in a circle of a diameter shorter than that of the base portion 4D.

It has been found most preferable that the pin portion 5D be a polygonal prism having a cross-sectional surface area contained in a circle of a diameter equal to or less than 4 mm±2 mm, the base portion 4D being 5 mm±2 mm in diameter, and the total height being about 13 mm±5 mm.

Figure 5:
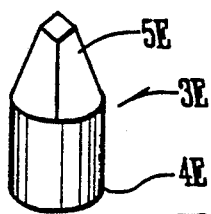
FIG. 5 is a perspective view illustrating another embodiment of rubber-made spike pin.

FIG. 5 is a perspective view illustrating another embodiment of rubber-made spike pin 3E comprising a cylindrical base portion 4E and a pin portion 5D in the form of a quadrangular pyramid extending from the base portion 4E.

The base portion 4 in FIGS. 4 and 5 is not limited to a cylindrical form, but may be a prism, and the pin portion 5 may be either a polygonal prism or a polygonal pyramid.

Figure 6:
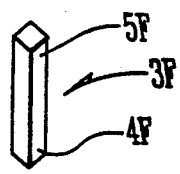
FIG. 6 is a perspective view illustrating another embodiment of rubber-made spike pin.

FIG. 6 shows a hard rubber-made spike pin 3F comprising a rod including a pin portion 5F and a base portion 4F defining no step.

Figure 7:
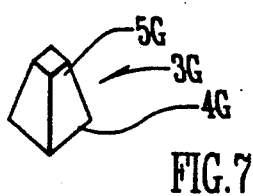
FIG. 7 is a perspective view illustrating another embodiment of rubber-made spike pin.

FIG. 7 shows a hard rubber-made spike pin 3G in the form of a polygonal pyramid having a broad portion as a base portion 4G and a thin tip portion as a pin portion 5G.

Figure 8:
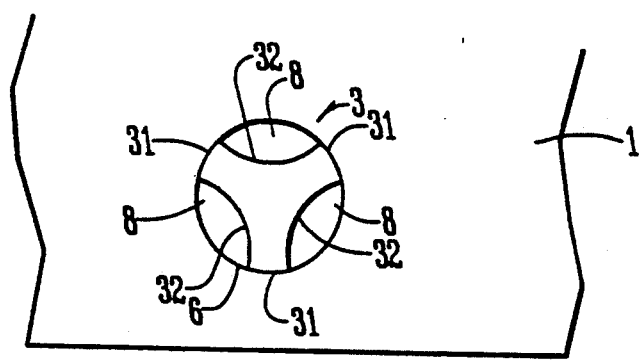
FIG. 8 is a fractional plan view of a tire illustrating one embodiment of the present invention.

FIG. 8 is a fractional plan view of a tire having a spike pin 3 mounted in its tread 1. The spike pin 3 is made of a rubber which is variable in hardness and has a generally Y-shaped cross-section including three arcuate recessed surfaces 32, 32 and 32 cut out from a cylinder leaving three discreet arcuate outer surface portions 31, 31 and 31 so as to define cooling gaps 8, 8 and 8 between the outer periphery of the spike pin 3 and a recess 6 formed in the tire tread 1.

Figure 9:
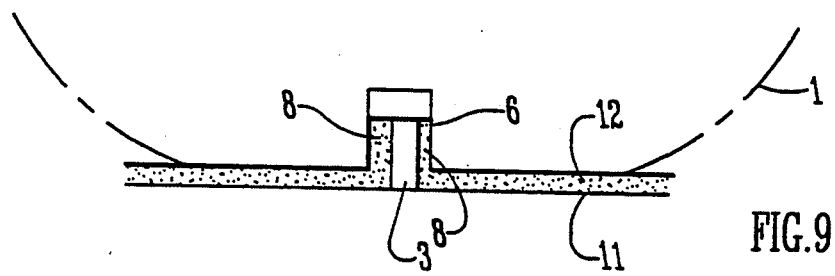
FIG. 9 is a schematical side view illustrating the relation of the spike pin with the road surface.

FIG. 9 is a schematical side view illustrating the relation of the spike pin 3 with the road surface 11, in which it is seen that the tip of the spike pin 3 may be flush with the outer peripheral surface of the tire and that the rubber material of the tire tread is compressively deformed under a load of a car, the spike pin 3 which has hardened because of the ice and snow 12 on the road surface 11 (as well as the outside air temperature) will pierce into the ice and snow to perform the non-slipping function. Further, the ice and snow on the road surface are cut into small pieces by the tire being compressed due to rotation, load and frictional resistance, and the cut pieces of ice and snow are jammed into the cooling gap 8 to effect the cooling of the spike pin 3.

The cross-sectional shape of the spike pin 3 and configuration of the recess 6 in the tire tread 1 for mounting the spike pin 3 may be selected arbitrarily as long as a gap 8 surrounding at least a portion of the periphery of the spike pin 3 exists between the outer periphery of the spike pin 3 and the recess 6 in the tire tread 2 when the spike pin is mounted in the recess 6.

Figure 10:
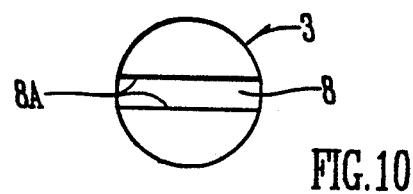
FIG. 10 is an end view of a spike pin according to another embodiment of the present invention illustrating the tip of the pin.

FIG. 10 is an end view of a spike pin 3 according to another embodiment of the present invention illustrating the tip of the spike pin in which a groove 8A is formed. The groove 8A intersects the top end surface of the spike pin and extends toward the base of the pin to define a cooling gap 8.

Figure 11:
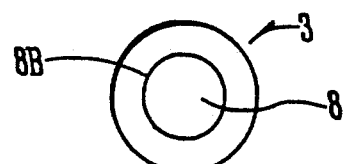
FIG. 11 is an end view of a spike pin according to still another embodiment of the present invention illustrating the tip of the pin.

FIG. 11 is an embodiment in which the spike pin has a recessed hole 8B in its top end to define a cooling gap 8.

Figure 12:
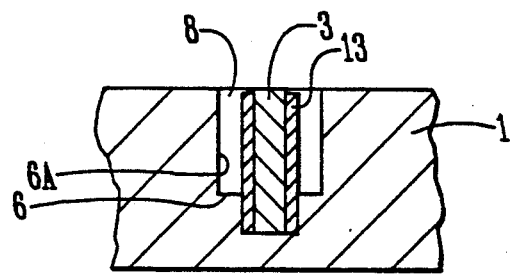
FIG. 12 is a vertical cross-sectional view of the mounting surface according to one embodiment of the invention.

FIG. 12 illustrates a spike pin 3 molded of a hard rubber such, as a rubber compound disclosed in the Japanese Patent Application Hei 2-274240 or a rubber having a property of hardening at a low temperature such as a rubber compound disclosed in the Japanese Patent Application Sho 63-235771. The peripheral side surface of the spike pin 3 is surrounded by a protective layer 13 of rubber or synthetic resin. The spike pin 3 is mounted in a mounting recess 6 formed in a substrate 1 such as a motor-car tire, shoe sole, the shoe of a walking stick or the like, with a gap 8 defined between the spike pin and the peripheral wall 6A of the mounting recess 6.

The rubber or synthetic resin of which the protective layer 13 is formed is the same material as that of which the substrate 1 is formed.

However, the protective layer and the substrate may not necessarily be formed of the same material. They may be made of different materials such as rubber for the protective layer 13 and synthetic resin for the substrate 1, for example.

The type of material for the protective layer 13 need only be softer than the hard rubber of which the spike pin 3 is made, but need not be determined in relation with the material of the substrate 3.

Figure 13:
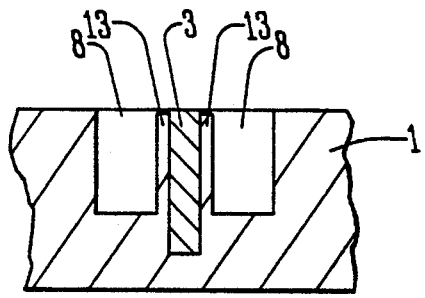
FIG. 13 is a vertical cross-sectional view of the mounting surface according to another embodiment of the invention.

FIG. 13 shows another embodiment of the invention in which a protective layer 13 in which the spike pin 3 is to be mounted is formed integral with the substrate 1 with a groove or recess formed around the protective layer 13 as a gap 8. The spike pin 3 of hard rubber is mounted in the protective layer 13.

The spike pin 3 may be in the form of a cylinder, polygonal prism, cone or pyramid or of any other shape. The means for mounting the spike pin to the substrate 1 may comprise adhesives, fastening means or the base portion of the spike pin in the form of a flange serving to prevent withdrawal of the pin from the substrate, for example.

Figure 14:
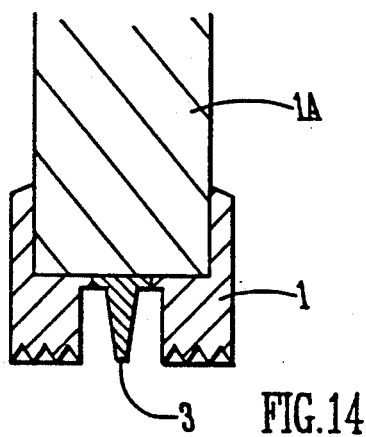
FIG. 14 is a fractional cross-sectional view of an embodiment of a crutch incorporating the invention.
Figure 15:
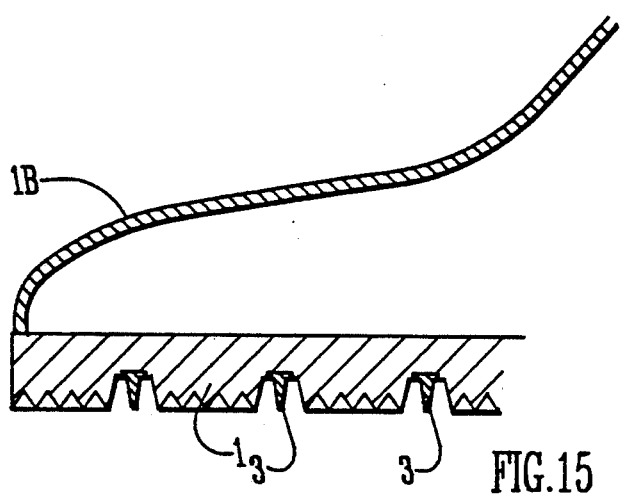
FIG. 15 is a fractional cross-sectional view of an embodiment of a shoe sole incorporating the invention.

FIG. 14 is a fractional cross-sectional view of an embodiment of a crutch 1A incorporating the invention as a shoe thereof; FIG. 15 is a fractional cross-sectional view of an embodiment of a shoe sole 1B incorporating the invention; and FIG. 16 is a fractional cross-sectional view of an embodiment of a tire 1C incorporating the invention.

Figure 16:
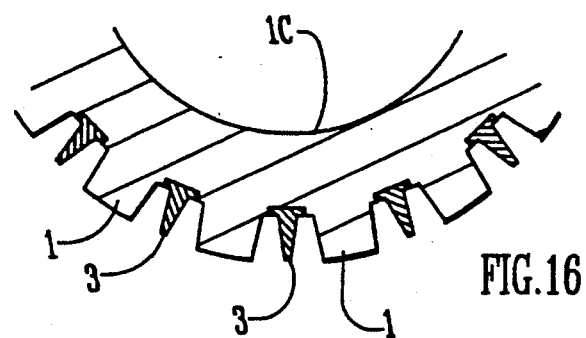
FIG. 16 is a fractional cross-sectional view of an embodiment of a tire incorporating the invention.

In FIGS. 14–16, the reference number 3 indicates a rigid portion in the form of a spike pin which is molded of a hard rubber or rigid synthetic resin. 1 is a soft portion molded of a soft rubber or soft synthetic resin.

When rubber materials are used, the rigid portion 3 is made of hard rubber while the soft portion 1 is made of soft rubber.

When synthetic resin materials are used, the rigid portion 3 is made of rigid synthetic resin while the soft portion 1 is made of soft synthetic resin.

When a combination of synthetic resin and rubber materials are used, the rigid portion 3 may be made of rigid synthetic resin while the soft portion 1 may be made of soft rubber, or alternatively the rigid portion 3 may be made of hard rubber while the soft portion 1 may be made of soft synthetic resin.

According to the invention, the rigid portion 3 is formed to have a surface area and volume smaller than those of the soft portion 1, and the height of the rigid portion 3 in the form of a spike pin is such that its top end is flush with or recessed from the top surface of the soft portion 1.

The rigid portion 3 in the form of a spike pin may be designed to be a relatively thin configuration for a crutch 1A or a shoe sole 1B on which a relatively light load is exerted, and to be a relatively thick configuration for a tire 1C on which a relatively heavy load exerted.

The volume, surface area and shape and thickness of the rigid portion 3 may be determined on the basis of rubber compounds, synthetic resin compounds and other materials used which will be bent or deformed under a pressure against an ordinary road surface.

Effects of the Invention

As described above, according to the present invention the rubber-made spike pin is mounted in a recess formed in a tread surface, with a gap between the spike pin and the peripheral wall of the recess, whereby positive penetration of the spike pin into an ice and snow surface is ensured and adequate frictional resistance is provided to produce good non-slipping effects.

In addition, the rubber-made spike pin according to the present invention is formed of a rubber material having a property of hardening at a low temperature, and is mounted in a tire tread with a cooling gap defined between the peripheral side wall of the spike pin and the tread. As a result, even though internal heat build-up as caused due to rotation of the tire should affect the temperature sensed by the spike pin, the cooling of the spike pin is provided by the ice and snow as jammed into the cooling gap to maintain the hardness of the spike pin to prevent it being softened.

It is thus to be appreciated that the present invention can maintain the performance of the spike pin formed of a rubber material having a property of hardening at a low temperature, insure the safety of a vehicle on an ice and snow-covered road as well as integrity of the road surface, and preventing an environmental pollution with dust. According to the present invention, a protective layer may be applied to the peripheral side surface of the spike pin formed of a hard rubber and the spike pin is mounted in a substrate, with a gap provided around the outer periphery of said protective layer. With this construction, deformation of the tread surface of the substrate under a load is accommodated by the gap to prevent the spike pin from being affected to thereby insure that the spike pin bites into the ice and snow surface. The protective layer is supported by the rigid spike pin to be kept integral with the spike pin.

In the case of the spike pin formed of a rubber having a property of hardening at a low temperature, ice and snow pieces as jammed in the gap around the protective layer will cool the spike pin through the protective layer, so that even if heat is built up due to the vibration and rotation of the substrate, the spike pin is kept from being softened.

Further, the protective layer acts to prevent the degradation of the spike pin which is exposed to the atmosphere through the gap as well as fracture or any damage which may be caused on the spike pin by external factors, thereby providing the effect of maintaining the performance and enhancing the durability of the spike pin.

According to the present invention, the shoe of the crutch, the shoe sole or the tire provide the non-slipping effect by the rigid portion of the spike pin biting into the road surface when it is covered with snow or frozen and by the soft portion of the spike pin being deformed when the road surface is exposed. This invention is thus capable of accommodating both of these road conditions and providing highly safe non-skidding spike pins in that when the road surface is exposed, the protruding spike pins are prevented from slipping on the road or scratching the road surface to produce dusts as was the case with the prior art.

The above description is included to illustrate the preferred embodiments of the invention and is not meant to limit the scope of the invention. From the above discussion, many variations will be apparent to one skilled in the art that would yet be encompassed by the spirit and the scope of the invention.

I claim:

1. A system for mounting a spike pin in a tread surface of a tire, comprising the combination of:
    a spike pin (3) made of a rubber material having a property of hardening at a low temperature,
    a tread surface (2) containing a recess (6), and
    a mounting arrangement in which said spike pin (3) is mounted with a gap (8) between the periphery of the spike pin and the peripheral wall of said recess, and with the top end of the spike pin being substantially flush with or recessed from the tread surface wherein on ice and snow surfaces, the spike pin can remain rigid while the tread deforms, thereby allowing the spike spin to protrude from the tread surface.

2. The system for mounting a spine pin according to claim 1, wherein said gap is provided around a portion of the periphery of said spike pin.

3. The system for mounting a spike pin according to claim 1, wherein a protective layer is applied to the peripheral side of said spike pin.

4. The system for mounting a spike pin according to claim 2, wherein a protective layer is applied to the peripheral side of said spike pin.

5. The system for mounting a spike pin according to claim 4, wherein said protective layer is made of the same material as that of which said mounting surface is formed.

6. The system for mounting a spike pin according to claim 4, wherein said protective layer is made of a material softer than that of which said spike pin is formed.

7. The system for mounting a spike pin according to any one of claims 1 to 6, including a soft portion comprising a mounting section defining said mounting surface, and a rigid portion comprising said spike pin made of the rubber material, wherein the surface area and volume of said rigid portion is smaller than those of said soft portion.

8. A spike pin for use in a tread surface of a tire, comprising the combination of:
   a pin (3) made of a rubber material having a property of hardening at a low temperature, and
   a tread surface (2) containing a recess (6) in which said spike pin (3) is mounted with a gap (8) between the periphery of the spike pin and the peripheral wall of said recess, and with the top end of the spike pin being substantially flush with or recessed from the tread surface wherein on ice and snow surfaces, the spike pin can remain rigid while the tread deforms, thereby allowing the spike pin to protrude from the tread surface.

9. A spike pin according to claim 8, wherein said spike pin is in the form of a polygonal prism or a polygonal pyramid.

10. A spike pin according to claim 8, wherein a groove is formed in the top end of the spike pin.

11. A spike pin according to claim 8, wherein a recessed hole is formed in the top end of the spike pin.

* * * * *